Nov. 22, 1955
A. E. NELSON
2,724,208
SNELLED FISH HOOK HOLDER
Filed May 25, 1953
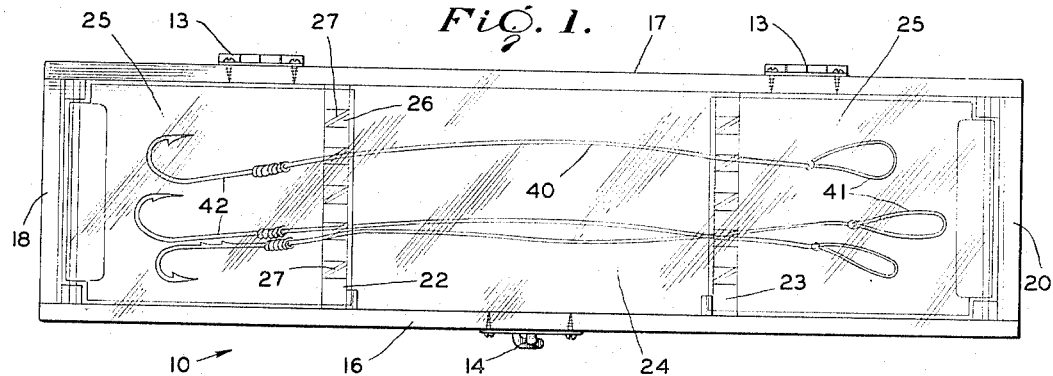
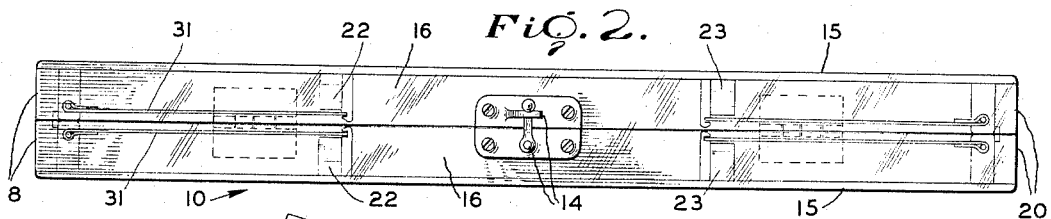
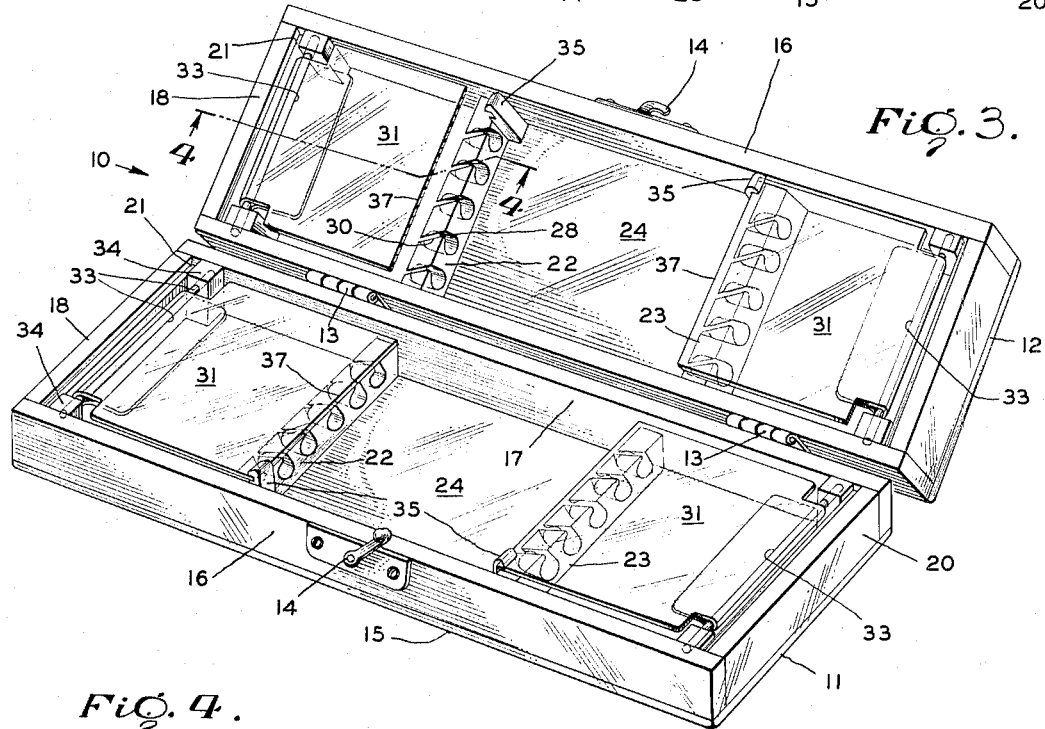
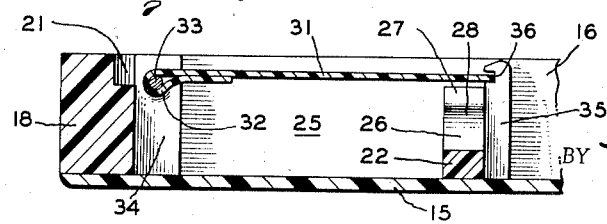
INVENTOR
*Arvid E. Nelson*
BY *Gustave Miller*
ATTORNEY

United States Patent Office 2,724,208
Patented Nov. 22, 1955

2,724,208

SNELLED FISH HOOK HOLDER

Arvid E. Nelson, Washington, D. C.

Application May 25, 1953, Serial No. 357,298

1 Claim. (Cl. 43—57.5)

This invention relates to a snelled fish hook holder.

It is an object of this invention to provide a snelled fish hook holder for holding snelled fish hooks in a convenient manner for ready access thereto by the fisherman, so that he may easily transport and store the same about his person, and may have them readily available when needed in fishing.

It has been conventional to provide snelled fish hook holders which hold the snelled fish hooks under tension, that is, the hooks are usually secured at one end and the snelled loops are secured under tension at the other end, so as to keep the snells between the fish hooks and the loops from getting tangled or snarled with each other.

However, with the advent of modern materials, particularly the synthetic fibre materials of which nylon is one well known example, these former conventional fish hook holders, by keeping the snells under tension or pressure, tend to stretch the fibre and weaken it, especially at the points of contact between these tension or pressure devices and the fibre snells. Conventional holders offer only a minimum of protection to snells from damage due to contact with other objects while being stored or transported or used by the fisherman. Furthermore, they are not as convenient and accessible as the present invention of readily selecting a snelled hook of desired size and characteristics for use.

With the present invention, the snelled fish hooks are readily accessible and readily differentiable by the fisherman, and he can gain easy access to any particular desired snelled fish hook without danger of tangling the fish hook snells together, and without the difficulty of manipulating the holder to release the tension on the fish hook snells.

A further object of this invention is to provide a snelled fish hook holder which is preferably made of such transparent material that the snelled fish hooks are readily visible at all times, both when being stored or transported, and when being selected.

Briefly, the fish hook holder of this invention consists of a rigid transparent sheet plastic rectangular container having cross bars dividing it into a middle compartment and two end compartments, with slots extending across the cross bars, and flexible semi-rigid transparent sheet plastic covers hinged eccentrically to the bottom thereof adjacent the compartment end walls, and provided with a notched latch means adjacent the cross bar ends of the compartments, so that the snelled fish hooks may be placed with the snelled loops in one end compartment, the snells extending through the slots and across the center compartment with the hooks in the other compartment, each end compartment having its cover which may be closed by merely pressing it down and snapping its ends across the latch notch to close the compartment, and may be opened by pressing the finger tip against the end of the closure to flex its middle upwardly, and thus remove the end from the latch notch thereby enabling the compartment cover to be easily lifted.

A cover is provided for the holder which is hinged to one of the side walls of the holder and adapted to cooperate with a latch means on the other side walls, and preferably this cover is a substantially identical holder in all respects thereby doubling the capacity of the fish hook holder.

With the foregoing and other objects in view, this invention comprises the combination, construction and arrangement of parts hereinafter set forth, claimed and disclosed in the accompanying drawings, wherein:

Fig. 1 is a top plan view of the snelled fish hook holder of this invention.

Fig. 2 is a front plan view thereof.

Fig. 3 is a perspective view of the partly opened fish hook holder.

Fig. 4 is an enlarged detail view taken on line 4—4 of Fig. 3.

There is shown at 10 the snelled fish hook holder of this invention, which in the preferred form, consists of two substantially identical fish hook holders 11 and 12 cooperatively hinged together at 13 and cooperatively latched together as at 14, so that either holder 11 or 12 acts as a cover to the other holder.

However, in place of one holder, a flat sheet of material may be substituted, thus halving the capacity of the holder. Also, obviously, any suitable hinge means and latch means may be substituted for the conventional hinges 13 and conventional latch means 14 shown.

The following description of one holder 11 applies equally and identically to the other holder 12. The fish hook holder 11 consists of a substantially rectangular rigid container having a bottom wall 15, rigid side walls 16 and 17, and rigid end walls 18 and 20, each end wall 18 and 20 being preferably notched as at 21, so that adjacent closure means may open wider as will later become apparent.

Extending across the bottom wall 15 between the side walls 16 and 17 and of less height than the side walls are a pair of spaced apart cross bars 22 and 23 of substantial width dividing the container into a center compartment 24 and end compartments 25. Extending transversely through each cross bar 22 and 23 and spaced from the top thereof are a plurality of cylindrical slots 26 which are connected to the tops thereof by angular slits 27, which slits 27 are of such angularity that the center compartment end of the slits 27 are tangent to one side of the angular slots 26, and the other ends of the slits are tangent to the other side of the cylindrical slots, as shown at 28 and 30.

Each end compartment 25 is provided with a closure member 31 hinged preferably adjacent the end wall 18 or 20, and provided with a latch means adjacent the cross bar 22 or 23. This closure member 31 is preferably of a semi-flexible transparent plastic sheet material having an hinging eye 32 formed at the hinging end thereof, passing about a hinge pin 33, which it will be noted particularly in Fig. 4, is eccentric to the bottom of the closure member 31, the hinge pin 33 being supported in hinge posts 34 adjacent the end walls 18 and 20, the notches 21 in the end wall, as previously described, permitting the closure member 31 to be hinged upwardly and extend outwardly over the end walls and remain in open position when desired.

The latching means consists of a latch boss 35 located adjacent one side wall and provided with a latch notch 36, which cooperates with an adjacent end 37 of the closure member 31 for holding closure member 31 in closed position.

In operation, the fisherman places his supply of snelled fish hooks with the snells 40 extending across the center compartment 24 and through the cylindrical slots 26, easily placing them into the cylindrical slots by bending them slightly angularly according to the angle of the entrance slits 27 and dropping them therethrough, with the snelled loops 41 in one end compartment and the fish hooks 42 in the other end compartment, while the closure members 31 are in their open wide position.

Due to the angularity of the entrance slits 27, as shown, the snelled fish hooks will remain in position, this being further insured by closing over the closure members 31. Due to their flexibility, it is only necessary to press the closure member 31 downwardly and its end 37 snapped into the notch 36. To open the closure member 31, a forefinger is placed over the end 37 pressing it back towards the end wall, and due to the eccentricity of the hinge, this bulges the center of the flexible member upwardly and withdraws the end 37 from the notch 36 permitting it to be opened to the wide position As explained before, each holder 11 or 12 serves as a cover for the other, but obviously, a sheet of transparent plastic material could be used in place of one holder over the other holder, and thus, provide a holder of smaller capacity. Several snelled fish hooks may be placed through each cooperating pair of cylindrical slots, thus providing a holder of more than sufficient capacity for the average fisherman's use.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

In combination with a container for snelled fish hooks having rigid bottom, end and side walls, and a cover member normally closing said container, a pair of parallel, aligned cross bars within said container dividing the same into three substantially equally sized compartments, said cross bars being of less height than said side walls and extending between said side walls, and having cylindrical bores extending therethrough in a direction transverse to the longitudinal extent of said bars adapted to receive the snells of fish hooks and loops disposed in the opposite ends of said container, said cross bars being formed with slits through the top edge thereof connecting with said bores, said slits being disposed in angular relation to the transverse plane of said bars whereby each snell must be angularly bent between its hook and loop to enter said slits and hence said bores, flexible transparent covers for the two end compartments, hinges at opposite ends of said container, each hinge mounting a cover for swinging movement longitudinally of the container, the free end of each cover extending beyond the inner edge of its adjacent cross bar, and an upright member adjacent each cross bar on its inner side at an end thereof, a notch in the outer side of each upright member adapted to be engaged by the free edge of its adjacent cover, whereby pressure exerted longitudinally on the inner edge of a cover will flex the same to release said edge from engagement with its associated notch, to free said cover for swinging movement about its hinge to open its associated compartment, each cover, when in closed position, closely overlying the slits in its associated cross bar to close the same against egress of snells contained therein.

References Cited in the file of this patent
UNITED STATES PATENTS

| | | |
|---|---|---|
| 952,314 | Ellsworth | Mar. 15, 1910 |
| 1,669,928 | Case | May 15, 1928 |
| 1,999,779 | Perrine | Apr. 30, 1935 |
| 2,208,649 | Strom | July 23, 1940 |
| 2,629,200 | Woodhead | Feb. 24, 1953 |

OTHER REFERENCES

Fishing Tackle of All Descriptions, William Mills & Son, 1930, page 61.